(12) United States Patent
Antongiorgi et al.

(10) Patent No.: US 11,487,269 B2
(45) Date of Patent: Nov. 1, 2022

(54) SYSTEM AND METHOD TO DERIVE AND APPLY COMPUTER NUMERICAL CONTROL GLOBAL OFFSETS DURING PART MEASUREMENT ON COORDINATE MEASURING MACHINE

(71) Applicant: GM Global Technology Operations LLC, Detroit, MI (US)

(72) Inventors: Axel F. Antongiorgi, Livonia, MI (US); Patrick M Hilber, Clarkston, MI (US); John R Wayton, Lambertville, MI (US); Daniel J. Pinkelman, Toledo, OH (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 383 days.

(21) Appl. No.: 16/710,942

(22) Filed: Dec. 11, 2019

(65) Prior Publication Data
US 2021/0181706 A1    Jun. 17, 2021

(51) Int. Cl.
*G05B 19/404* (2006.01)
*G01B 11/00* (2006.01)
*G01B 5/008* (2006.01)

(52) U.S. Cl.
CPC .......... *G05B 19/404* (2013.01); *G01B 5/008* (2013.01); *G01B 11/005* (2013.01); *G05B 2219/50289* (2013.01)

(58) Field of Classification Search
CPC ........ G05B 19/404; G05B 2219/50289; G01B 5/008; G01B 11/005
See application file for complete search history.

(56) References Cited

U.S. PATENT DOCUMENTS

| 8,509,940 B2 | 8/2013 | Gu et al. | |
|---|---|---|---|
| 8,676,373 B2 | 3/2014 | Gu et al. | |
| 8,712,577 B2 | 4/2014 | Gu et al. | |
| 10,067,497 B2 | 9/2018 | Gu et al. | |
| 2009/0235547 A1* | 9/2009 | Hellier | G01B 21/04 33/503 |
| 2012/0215341 A1* | 8/2012 | Gu | G05B 19/4083 700/173 |
| 2012/0215342 A1* | 8/2012 | Gu | G05B 19/401 700/192 |
| 2013/0278725 A1* | 10/2013 | Mannan | H04N 13/254 348/46 |
| 2014/0260627 A1* | 9/2014 | Ferrari | G01B 21/04 73/618 |
| 2016/0191911 A1* | 6/2016 | Filhaber | H04N 5/247 348/95 |
| 2018/0107190 A1* | 4/2018 | Marshall | G05B 19/401 |
| 2018/0136626 A1* | 5/2018 | Gu | G05B 19/402 |
| 2021/0140752 A1* | 5/2021 | Kocic | G01B 21/047 |

* cited by examiner

*Primary Examiner* — Thomas C Lee
*Assistant Examiner* — Ameir Myers
(74) *Attorney, Agent, or Firm* — Vivacqua Crane, PLLC

(57) ABSTRACT

A method to derive and apply computer numerical control global offsets includes: measuring features of a machined part using a coordinate measuring machine (CMM); programming a first processor within the CMM to receive the dimensions of the features and to output computer numerical control (CNC) offsets; and forwarding the CNC offsets from the CMM to a CNC machining system to correct operation of the CNC machining system.

14 Claims, 3 Drawing Sheets

SYSTEM AND METHOD TO DERIVE AND APPLY COMPUTER NUMERICAL CONTROL GLOBAL OFFSETS DURING PART MEASUREMENT ON COORDINATE MEASURING MACHINE

INTRODUCTION

The present disclosure relates to machining systems using coordinate measurement machines to provide data for computer numerical machine correction.

Machined components received for introduction into systems such as for automobile vehicles are dimensionally inspected for conformance to specifications and may often require additional machining for example to add apertures or machined surfaces, or to modify components found by inspection to deviate from nominal specifications. These components are commonly inspected using a coordinate measuring machine (CMM), which performs inspections using for example touch sensors, optical sensors and the like. CMMs commonly produce a CMM report identifying one or more features of the component which deviate from predetermined or nominal tolerances.

After the CMM report is generated, it is common to export the CMM report data and then separately apply an algorithm to the CMM report data to produce one or more offsets. The offsets are then used to separately program a computer numerical control (CNC) machine which performs machining operations to add further features or to correct the identified deviations, thereby bringing the features of the machined component within nominal condition ranges. Computer numerical controlled (CNC) machining systems are typically used in industrial settings to accurately machine parts according to previously defined plans. Often these plans are developed in a computer aided design package and may be represented in the form of engineering drawings. A CNC machining system may operate according to an assembled sequence of commands (e.g., G code) that instruct the system to machine a part by moving a controllable cutting tool. During the operation, the system may monitor the position of a tool, and may control tool position relative to the part via precise servomotor control.

In order to perform the offset calculations, there is a need at present to manually search for coordinate data in a part quality database which is used to preposition the machine table and to preposition the component on the CNC machine table. This data is converted to a coordinate system that matches the CNC machine requirements, then imported into an external software database to perform the offset calculations, and then export the offset calculation results to the CNC machine. The part quality database data is normally maintained by a third party, which may introduce error into the offset calculations during data acquisition, interpretation or transfer.

Thus, while current CMM machine and CNC machines achieve their intended purpose, there is a need for a new and improved system and method to derive and apply computer numerical control global offsets.

SUMMARY

According to several aspects, a system to derive and apply computer numerical control global offsets includes a coordinate measuring machine (CMM) measuring features of a machined part. A first processor within the CMM is programmed to receive the measured features and to output computer numerical control (CNC) offsets to correct operation of a CNC machining system.

In another aspect of the present disclosure, dimensional information of the machined part is saved in the CMM and retrieved by the first processor.

In another aspect of the present disclosure, a plurality of CNC offsets of the machined part is calculated by the first processor applying a group of variable data in an offset calculation subroutine.

In another aspect of the present disclosure, a report of the plurality of CNC offsets is forwarded by the CMM to the CNC machining system.

In another aspect of the present disclosure, the CMM includes a second processor having stored machined part measurement data from the CMM used to generate deviation reports.

In another aspect of the present disclosure, a plurality of variable data is applied by the second processor.

In another aspect of the present disclosure, the variable data includes coordinate system data including a feature measurement, a machine origin, a rotational center position of one or more tables and a fixture origin.

In another aspect of the present disclosure, the variable data includes feature information including feature names, feature nominal positions, feature measured positions, feature tolerances and measurement directions.

In another aspect of the present disclosure, the measured features include measured dimensions taken with respect to an established datum of the machined part.

In another aspect of the present disclosure, the measured features include measured dimensions taken with respect to at least one control surface of the machined part.

According to several aspects, a method to derive and apply computer numerical control global offsets, comprises: measuring features of a machined part using a coordinate measuring machine (CMM), programming a first processor within the CMM to receive the dimensions of the features and to output computer numerical control (CNC) offsets; and forwarding the CNC offsets from the CMM to a CNC machining system to control operation of the CNC machining system.

In another aspect of the present disclosure, the method includes retrieving dimensional information of the machined part saved in the CMM by the first processor.

In another aspect of the present disclosure, the method includes calculating a plurality of CNC offsets of the machined part by the first processor.

In another aspect of the present disclosure, the method includes forwarding a report of the plurality of CNC offsets by the CMM to a CNC machining system.

In another aspect of the present disclosure, the method includes storing machined part measurement data from the CMM in a second processor of the CMM and generating deviation reports using the second processor.

In another aspect of the present disclosure, the method includes applying a plurality of variable data by the second processor in the CMM, the variable data including coordinate system data including a feature measurement, a machine origin, a rotational center position of one or more tables and a fixture origin.

In another aspect of the present disclosure, the method includes applying a plurality of variable data by the second processor in the CMM, the variable data including feature information including feature names, feature nominal positions, feature measured positions, feature tolerances and measurement directions.

According to several aspects, a method to derive and apply computer numerical control global offsets comprises: measuring features of a machined part using a coordinate measuring machine (CMM), programming a processor of the CMM to receive the dimensions of the features and to output computer numerical control (CNC) offsets; retrieving dimensional information of the machined part by the processor; calculating the CNC offsets of the machined part using the processor; and forwarding the CNC offsets by the CMM to a CNC machining system.

In another aspect of the present disclosure, the method includes printing a quality report identifying the CNC offsets, printing a quality report identifying the CNC offsets.

In another aspect of the present disclosure, the method includes loading the CNC offsets using a human machine interface (HMI) on the CNC machining system; and machining a next part.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
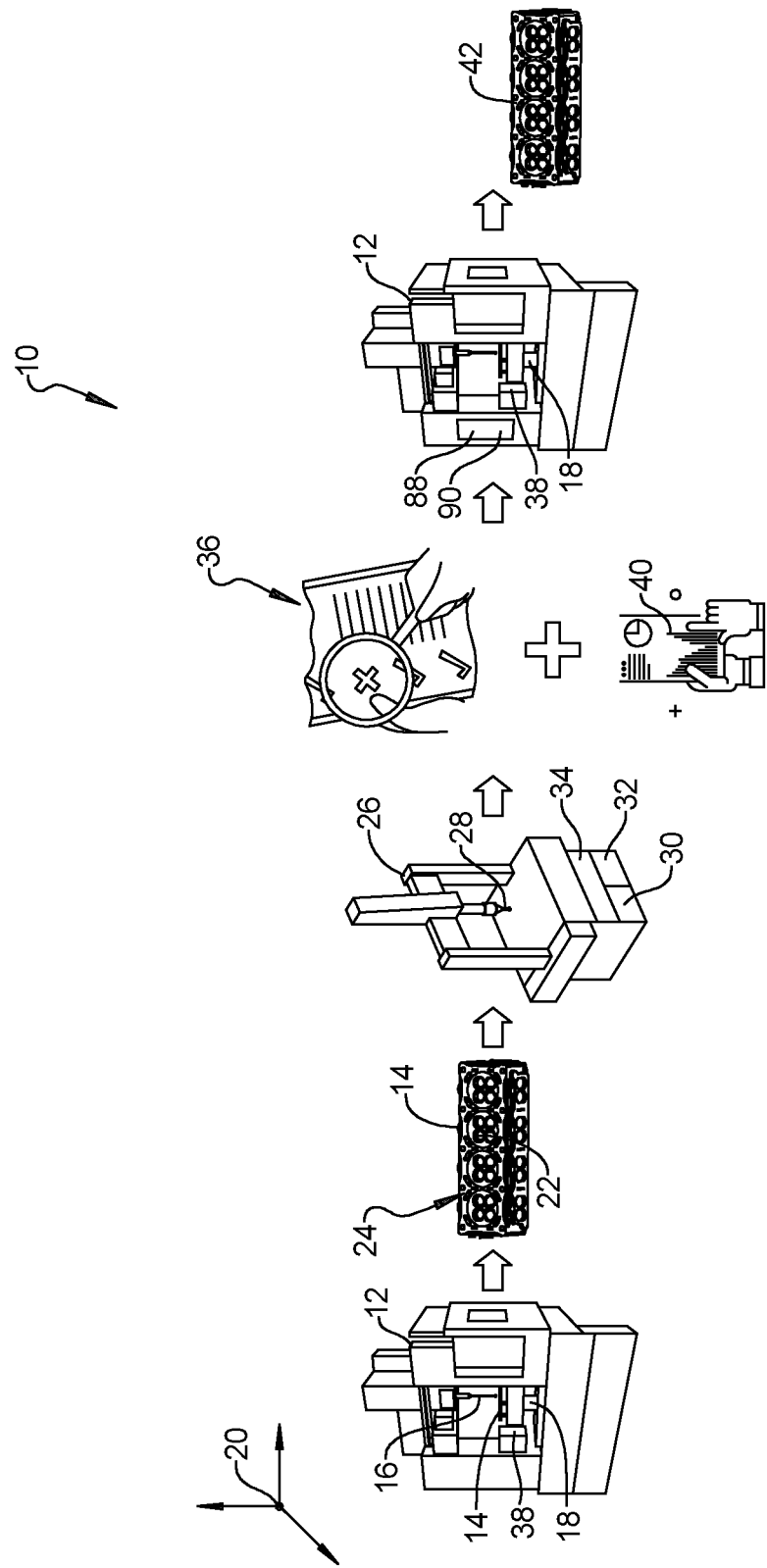
FIG. 1 is a diagrammatic presentation of a system and method to derive and apply computer numerical control global offsets according to an exemplary aspect.

Referring to FIG. 1, an exemplary system and method to derive and apply computer numerical control global offsets 10 using a computer numerical controlled (CNC) machining system 12 to compensate the dimensional accuracy of a part 14 is shown. According to several aspects, the CNC machining system 12 may define a CNC mill, such as, for example, a 4-axis mill. In the various aspects of the 4-axis CNC machining system 12, a cutting spindle 16 may be capable of three degrees of translation, and a CNC table 18 may be capable of one degree of rotation.

The CNC machining system 12 may also define a 5-axis CNC machine, in which a first table sits on a second table (not shown). In the CNC machining systems 12, the cutting spindle 16 may be capable of three degrees of translation relative to an illustrative x-y-z coordinate system 20. Rotation of either the first-table or the second table may be considered rotation about a first axis or a second axis.

The part 14 may include one or more features, e.g., a hole 22 provided through one or more machining processes through one or more established datum or control surfaces 24. Once the one or more features are machined into the part 14, a dimensional measuring device, such as a coordinate measuring machine (CMM) 26 measures one or more dimensions of the part 14. Measured dimensions may be taken with respect to any one or all of the established datum or control surfaces 24 that may be specified in a corresponding engineering drawing of the part 14. The engineering drawing may specify a nominal dimension for the measurements and may further provide acceptable tolerances above and below the nominal dimensions.

The CMM 26 may include a contact probe 28 that may be numerically located in three-dimensional space by a measurement processor 30. The contact probe 28 may be moved into physical contact with the part 14, at which time the measurement processor 30 may record a three-dimensional position of the control surface 24 or feature such as the hole 22 of the part 14. By comparing multiple recorded positions of the multiple features, the measurement processor 30 reports one or more distances or dimensions of machined worksurfaces or features created to match the part 14. Alternatively, in lieu of using the contact probe 28 the CMM 26 may measure and report dimensions of machined workpieces using an optical sensor or a laser sensor.

According to several aspects the CMM 26 also includes a compensation processor 32 that stores part measurement data 34 from the CMM 26, generates deviation reports and performs offset calculations to supply to the CNC machining system 12. The compensation processor 32 may include, for example and without limitation, a COMP (Capability Optimization for Machining Process) software package. The CMM 26 conducts and collects measurements of the part 14, for example using the contact probe 28, and computes a deviation report 36 identifying dimensions of the part 14 that deviate from predefined dimensional ranges above and below predefined nominal dimensions.

Using the deviation report 36 and information saved relative to a holding or clamping fixture 38, which is in-turn positioned on the CNC table 18 of the CNC machining system 12, the compensation processor 32 of the CMM 26 then further generates one or more CNC offsets 40. Once computed, the CNC offsets 40 are loaded into the CNC machining system 12 together with the part 14 to enhance the dimensional accuracy of the subsequent machining processes to produce a finished part 42 having dimensions within the dimensional ranges and preferably at the nominal dimensions specified by the engineering drawing.

Referring to FIG. 2 and again to FIG. 1, a CMM program 44 operating in the compensation processor 32 applies a plurality of variable data. Exemplary variable data may include, without limitation, coordinate system data 46 including a feature measurement 48, a machine origin 50, a rotational center position 52 of one or more tables and a fixture origin 54. The variable data may also include feature information 56 including and not limited to feature names 58, feature nominal positions 60, feature measured positions 62, feature tolerances 64 and measurement directions 66. When for example a dimension of one or more machined features deviates from the nominal dimensions provided in the engineering drawing, offsets are generated by the compensation processor 32 used to modify the machining process and attempt to reduce the deviation. According to several aspects, two types of offsets may be available to reduce deviations: global offsets and local offsets (note that both may be concurrently available and implemented).

A global offset may adjust the origin and/or orientation of the global or machine coordinate system 20. This type of offset may affect the dimensions of the features in the part 14. In this regard, the global offset may be similar to a rigid body shift or a rotation of the part 14. Alternatively, a local offset may selectively adjust one feature or group of features by modifying the nominal dimensions/positioning of the CNC machining system 12 for that feature or group of features.

A group of the variable data 68 is forwarded to and used in an offset calculation subroutine 70 to calculate the CNC offsets 40. As noted above the CNC offsets 40 are then loaded into the CNC machining system 12. The CMM program 44 within the CMM 26 also retrieves the data to produce the deviation report 36.

Figure 2:
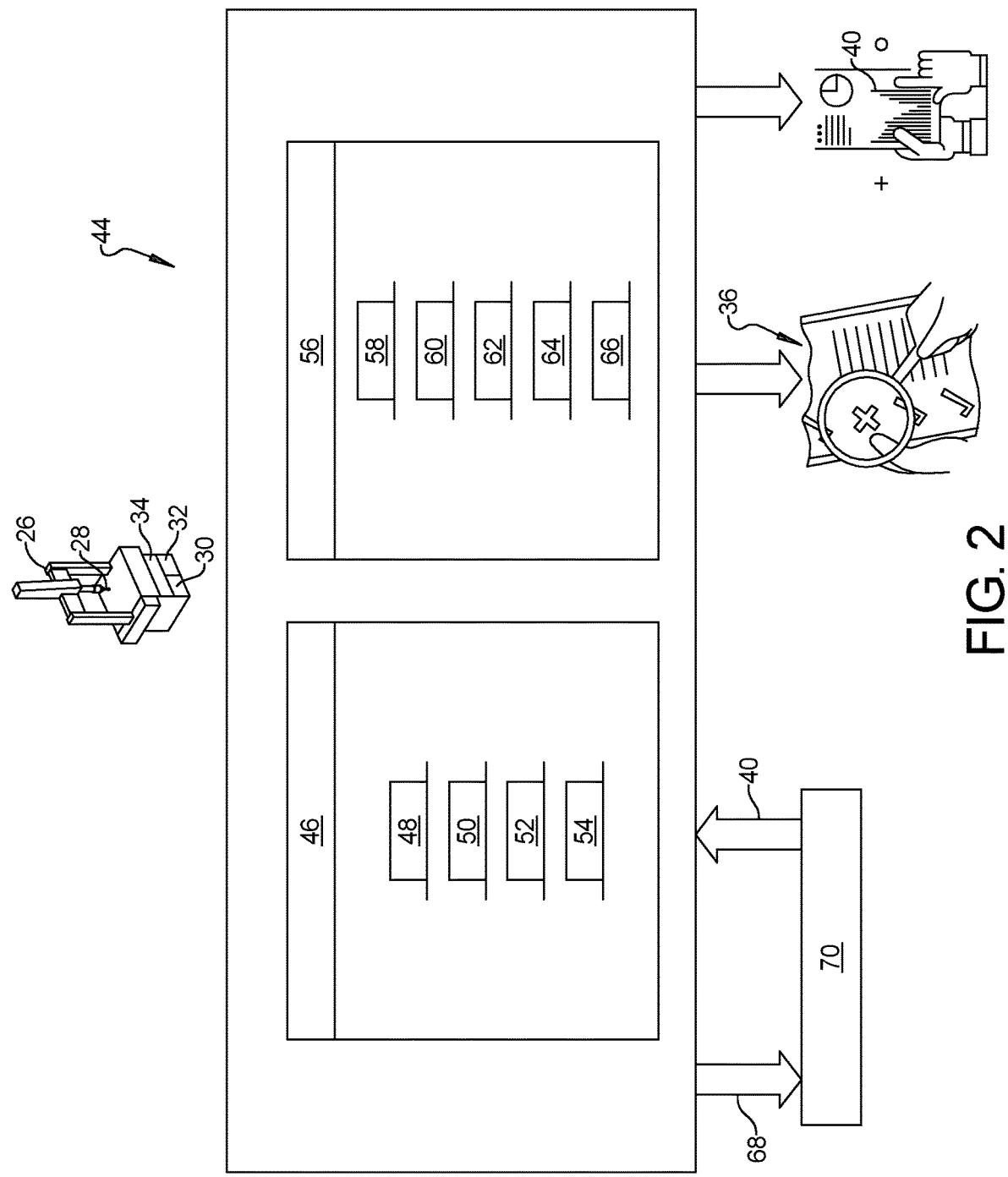
FIG. 2 is a flow diagram of a coordinate measuring machine program operating in a compensation processor of a coordinate measuring machine for the system and method of FIG. 1.

Referring to FIG. 3 and again to FIGS. 1 and 2, method steps for performing the operations of the system and method to derive computer numerical control global offsets 10 are provided. In an initial step 72 the CNC machining system 12 initially machines the part 14. In a delivery step 74 the part 14 is delivered to the CMM 26 to perform a quality check against part specifications. In a measurement step 76 the part 14 is measured using the CMM 26. In a calculation step 78 data from the measurement step 76 is used to perform offset calculations. In a printing step 80 the offset or offsets are printed on a quality report. Periodically, in a callout step 82 following the calculation step 78 the CMM 26 calls for operation of the offset calculation subroutine 70. Once the offset calculation subroutine 70 is completed, in a return step 84 the one or more CNC offsets are sent to the CMM program 44. Following completion of the printing step 80 the CNC offsets are loaded using for example a human machine interface (HMI) on the CNC machining system 12 and a next part is cut or machined to specifications.

The CMM 26 calculates adjustments to a position of the CNC table 18 and its orientation, plus the position of the clamping fixture 38 relative to the CNC table 18. This enables correcting a position and an orientation of the features on the part 14 machined using a specific operation with as few as six offset variables, which are consistent from machine to machine.

Figure 3:
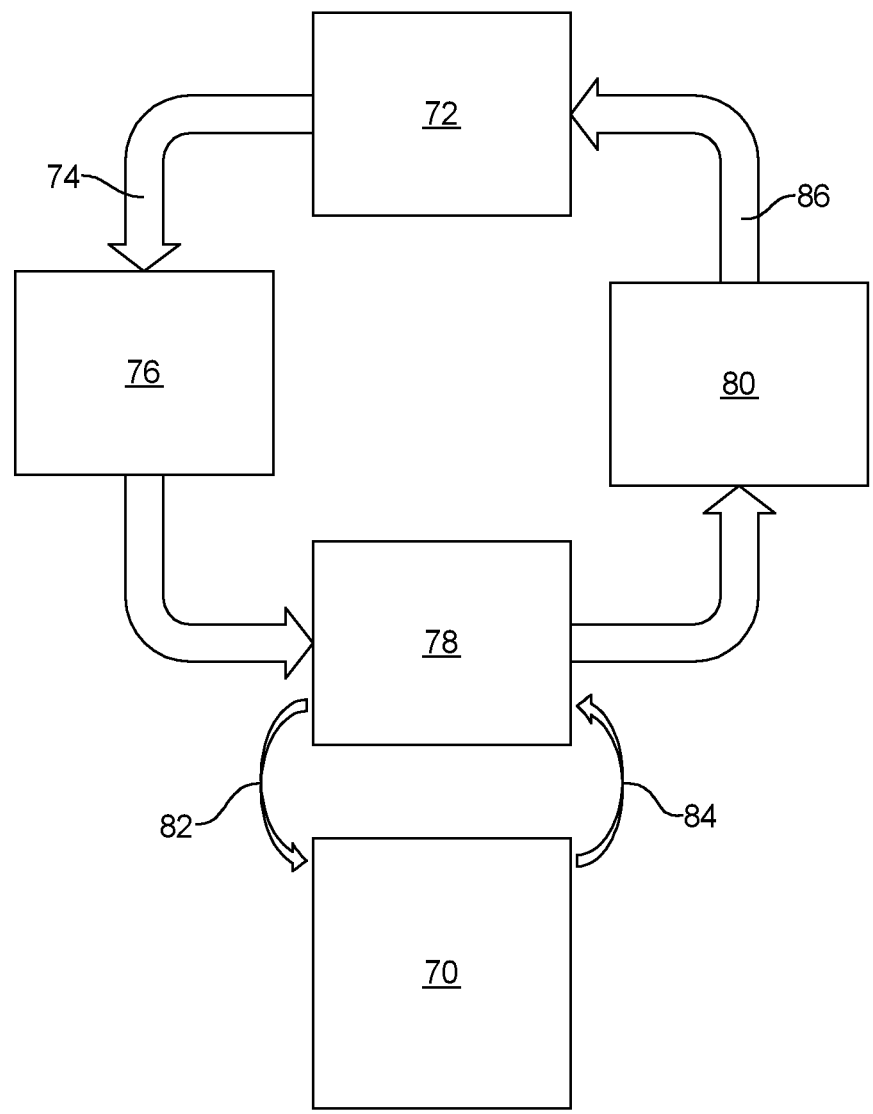
FIG. 3 is a flow diagram of the steps for performing the method of the system and method of FIG. 1.

With continuing reference to FIG. 1 and again to FIGS. 2 and 3, a block 88 represents registers built into the CNC machining system 12, which provide access to, for example, a fixed G-code of the CNC machining system 12. The registers are data holding places or offsets that allow the variables calculated by compensation equations applied in the compensation processor 32 of the CMM 26 to be implemented within a fixed G-code compensation program without altering the G-code compensation program itself. Through the use of the built-in registers, the global and local compensation variables can be accessed by the fixed G-code of the CNC machining system 12 without reprogramming any of the G-code on the CNC machining system 12.

A block 90 represents the CNC compensation program, which is accessed through the registers. The global and local variables determined by the compensation processor 32 are sent through the registers to be input as parameters of the CNC compensation program within the CNC machining system 12. For individual features requiring compensation, there are three local offset variables, which correspond to three local parameters within the CNC compensation program.

Within the CNC compensation program, the global parameters (for the global offsets) are entered first and are consistent for the part 14. Then, the local parameters (for the local offsets) are overlaid onto the global parameters when needed for specific features or groups of features. Therefore, the global parameters are implemented for all features of the part 14, and local parameters are implemented for specific features of the part 14, if any local variables were determined.

A system and method to derive and apply computer numerical control global offsets of the present disclosure offers several advantages. These include collection of part measurement data in a CMM and performance of CNC offset calculations by a processor residing in the CMM. A quality report is also printed by the CMM. The present system and method allows off-shifts, without engineering support, to make CNC offset adjustments and thereby reduce CNC machining system downtime. The present system and method provides a unified location (the CMM) for part measurement, part quality data collection and reporting, and CNC offset corrections to be calculated.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system to derive and apply computer numerical control offsets, comprising:
    a computer numerical control (CNC) machining system programmed to machine a part according to a defined plan, wherein the CNC machining system includes a plurality of registers;
    a coordinate measuring machine (CMM) having a measurement processor for measuring a plurality of features of the machined part, a first compensation processor programmed for receiving a plurality of measurements of the plurality of features, calculating the CNC offsets based at least in part on the plurality of measurements and a group of variable data, and storing the CNC offsets in the plurality of registers of the CNC machining system;
    wherein the group of variable data includes a feature measurement, a machine origin, a rotational center position of one or more tables, a fixture origin, feature names, feature nominal positions, feature measured positions, feature tolerances and measurement directions; and
    wherein the CNC offsets stored in the plurality of registers of the CNC machining system are accessed by a CNC compensation program to correct an operation of the CNC machining system during a subsequent machining process.

2. The system to derive and apply computer numerical control offsets of claim 1, further including dimensional information of the machined part saved in the CMM and retrieved by the first compensation processor.

3. The system to derive and apply computer numerical control offsets of claim 2, further including a report of the CNC offsets forwarded by the CMM to the CNC machining system.

4. The system to derive and apply computer numerical control offsets of claim 1, wherein the CMM includes a second compensation processor having stored machined part measurement data from the CMM used to generate deviation reports.

5. The system to derive and apply computer numerical control offsets of claim 1, wherein the plurality of measurements of the plurality of features includes measured dimensions taken with respect to an established datum of the machined part.

6. The system to derive and apply computer numerical control offsets of claim 1, wherein the plurality of measurements of the plurality of features includes measured dimensions taken with respect to at least one control surface of the machined part.

7. A method to derive and apply computer numerical control offsets, comprising:
    machining a part using a computer numerical control (CNC) machining system programmed to machine the part according to a defined plan, wherein the CNC machining system includes a plurality of registers;
    programming a measurement processor within a coordinate measuring machine (CMM) to measure a plurality of features of the machined part using the CMM;
    programming a first compensation processor within the CMM to receive a plurality of measurements of the plurality of features of the machined part, to calculate the CNC offsets based at least in part on the plurality of measurements and a group of variable data, and to store the CNC offsets in the plurality of registers of the CNC machining system;
    wherein the group of variable data includes a feature measurement, a machine origin, a rotational center position of one or more tables, a fixture origin, feature names, feature nominal positions, feature measured positions, feature tolerances and measurement directions; and
    executing a CNC compensation program within the CNC machining system using the CNC offsets stored in the plurality of registers of the CNC machining system as input parameters of the CNC compensation program to correct an operation of the CNC machining system during a subsequent machining process.

8. The method to derive and apply computer numerical control offsets of claim 7, further including retrieving dimensional information of the machined part saved in the CMM by the first compensation processor.

9. The method to derive and apply computer numerical control offsets of claim 8, further including calculating the CNC offsets of the machined part using the first compensation processor.

10. The method to derive and apply computer numerical control offsets of claim 9, further including forwarding a report of the CNC offsets by the CMM to the CNC machining system.

11. The method to derive and apply computer numerical control offsets of claim 7, further including storing machined part measurement data from the CMM in a second compensation processor of the CMM and generating deviation reports using the second compensation processor.

12. A method to derive and apply computer numerical control offsets, comprising:
    machining a part using a computer numerical control (CNC) machining system programmed to machine the part according to a defined plan, wherein the CNC machining system includes a plurality of registers;
    programming a measurement processor within a coordinate measuring machine (CMM) to measure a plurality of features of the machined part using the CMM;
    programming a compensation processor of the CMM to receive a plurality of measurements of the plurality of features and to output computer numerical control (CNC) offsets;
    calculating the CNC offsets of the machined part using the compensation processor, based at least in part on the plurality of measurements and a group of variable data;
    wherein the group of variable data includes a feature measurement, a machine origin, a rotational center position of one or more tables, a fixture origin, feature names, feature nominal positions, feature measured positions, feature tolerances and measurement directions;
    storing the CNC offsets calculated by the compensation processor of the CMM in the plurality of registers of the CNC machining system; and
    executing a CNC compensation program within the CNC machining system using the CNC offsets stored in the plurality of registers of the CNC machining system as input parameters of the CNC compensation program to correct an operation of the CNC machining system during a subsequent machining process.

13. The method to derive and apply computer numerical control offsets of claim 12, further including printing a quality report identifying the CNC offsets.

14. The method to derive and apply computer numerical control offsets of claim 12, further including:
    loading the CNC offsets using a human machine interface (HMI) on the CNC machining system; and
    machining a next part.

* * * * *